US008954366B2

(12) United States Patent
Schmidt

(10) Patent No.: US 8,954,366 B2
(45) Date of Patent: Feb. 10, 2015

(54) SERVICE TO RECOMMEND OPENING AN INFORMATION OBJECT BASED ON TASK SIMILARITY

(75) Inventor: Benedikt Schmidt, Winterberg (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 13/546,451

(22) Filed: Jul. 11, 2012

(65) Prior Publication Data

US 2014/0019975 A1   Jan. 16, 2014

(51) Int. Cl.
*G06N 5/02* (2006.01)
*G06Q 10/06* (2012.01)

(52) U.S. Cl.
CPC .............. *G06N 5/02* (2013.01); *G06Q 10/0633* (2013.01)
USPC .......................................................... 706/45

(58) Field of Classification Search
None
See application file for complete search history.

(56) References Cited

U.S. PATENT DOCUMENTS

| 2002/0010625 | A1* | 1/2002 | Smith et al. ..................... 705/14 |
| 2008/0065682 | A1* | 3/2008 | Karasudani et al. .......... 707/102 |
| 2009/0157653 | A1* | 6/2009 | Herlocker et al. ................ 707/5 |
| 2011/0320240 | A1* | 12/2011 | Flores et al. ................. 705/7.27 |
| 2012/0117569 | A1* | 5/2012 | Fogel et al. ................... 718/102 |

OTHER PUBLICATIONS

Kim et al, Document-based workflow modeling: a case-based reasoning approach, 2002.*
"Drools Fusion", Business Logic Integration Platform, Apr. 24, 2012, 6 pages.
Rattenbury, et al, "CAAD: An Automatic Task Support System", In Proc. CHI 2007, Apr. 28-May 3, 2007, 10 pages.
Oliver, et al, "SWISH: Semantic Analysis of Window Titles and Switching History", IUI 2006, Jan. 29-Feb. 1, 2006, 8 pages.
Schmidt, et al, "Hierarchical Task Instance Mining in Interaction Histories", Proceedings of the 29th ACM International Conference on Design of Communication, Oct. 3-5, 2011, 8 pages.
Brdiczka, "From Documents to Tasks" Deriving User Tasks From Document Usage Patterns, IUI 2010, Feb. 7-10, 2010, 4 pages.
Bao, et al, "Comparing Different Text Similarity Methods" UH Computer Science Technical Report 461, 2007, 32 pages.
Brdiczka, et al, "Temporal Task Footprintin•Identifying Routine Tasks by Their Temporal Patterns", Word Journal of the International Linguistic Association, Feb. 2010, 4 pages.
Bystroem, "Task Complexity, Information Types and Information Sources: Examination of Relationships", Jun. 1999, 156 pages.
Czerwinski, et al, "A diary study of task switching and interruptions", Proceedings of the SIGCHI, Apr. 24-29, 2004, 8 pages.

(Continued)

*Primary Examiner* — Alan Chen
*Assistant Examiner* — Mikayla Chubb
(74) *Attorney, Agent, or Firm* — Brake Hughes Bellerman LLP

(57) ABSTRACT

The present description is directed to a technique to store one or more tasks, each task including one or more knowledge actions (KAs) that includes an action of one of a plurality of KA types being performed, determine a degree of similarity between each of one or more of the stored tasks and a current task, identify one of the stored tasks that most closely matches the current task based on the degree of similarity for each of the one or more stored tasks, identify one or more information objects that were open for the identified stored task, identify one or more information objects that are currently open for the current task, determine an additional information object that was open for the identified stored task but is not currently open for the current task, and provide a recommendation to a user to open the additional information object.

26 Claims, 9 Drawing Sheets

(56) References Cited

OTHER PUBLICATIONS

Ferrucci, et al, "Uima: An architectural approach to unstructured information processing in the corporate research environment", Journal of Natural Language Engineering, 2004, pp. 327-348.

Haedrich, "Situation-oriented Provision of Knowledge Services", Dissertation, Martin Luther Universität Halle-Wittenberg, 2008, 415 pages.

Newell, et al, "Human Problem Solving", Prentice-Hall, Englewood Cliffs, NJ, 1972, 8 pages.

Oliver, et al, "SWISH: Semantic Analysis of Window Titles and Switching History", Proceedings of the 11th international Conference on Intelligent User Interfaces, 2006, pp. 201-209.

O'Conaill, et al, "Timespace in the Workplace: Dealing with Interruptions", Mosaic of Creativity, May 1995, pp. 262-263.

Rath, et al, "UICO: An Ontology-Based User Interaction Context Model for Automatic Task Detection on the Computer Desktop", CIAO 2009, Jun. 2009, 10 pages.

Rattenbury, et al, "An Activity Based Approach to Context-Aware Computing", University of California at Berkeley, Dec. 17, 2008, 157 pages.

Rattenbury, et al, "CAAD: An Automatic Task Support System", Proceedings of the SIGCHI Conference on Human Factors in Computing Systems, May 2007, pp. 696-706.

Salton, et al, "A Vector Space Model for Automatic Indexing", ACM Communications of the Information Retrieval and Language Processing, vol. 18 No. 11, Nov. 1975, 8 pages.

Voelkel, "Personal Knowledge Models with Semantic Technologies", Karlsruhe Institute of Technology, Jan. 20, 2010, 267 pages.

Zacks, et al, "Event Structure in Perception and Conception", Psychological bulletin, 2001, 79 pages.

* cited by examiner

SERVICE TO RECOMMEND OPENING AN INFORMATION OBJECT BASED ON TASK SIMILARITY

TECHNICAL FIELD

This description is directed generally to work support and increased productivity of knowledge workers or workers that use a computer, and in particular, to a computer-implemented method, apparatus, and computer program product related to a service to recommend opening an information object based on task similarity.

BACKGROUND

In some cases, knowledge work may be fragmented, as individuals have to work with information artifacts (e.g. documents, Business Objects and other information) that are viewed and modified with very different applications or application transactions. In some cases, individuals may work in different tasks in parallel or rapid succession. Each task may include, for example, a set of information objects that is consumed (e.g., viewed or reviewed), created and/or transformed to reach a task goal. In some cases, it may be difficult to associate the information objects to the different tasks they belonged to, especially if the user faced several interruptions or worked in rapid succession on the tasks.

In some cases, individuals may attempt to address the fragmentation by simple and manual methods, such as by using post-its to help to remember transactions or things to do, paper to-do lists that log or record the open work items to assist in organizing large amounts of information, and other techniques. More automated or electronic techniques have also been used to keep track of information.

SUMMARY

In one general aspect, a computer program product is provided. The computer program product is tangibly embodied on a computer-readable storage medium and includes executable code that, when executed, is configured to cause at least one data processing apparatus to store one or more tasks, each task including one or more knowledge actions (KAs) that includes an action of one of a plurality of KA types being performed on an information object, determine a degree of similarity between each of one or more of the stored tasks and a current task, identify at least one of a plurality of the stored tasks that most closely matches the current task based on the degree of similarity for each of the one or more stored tasks, identify one or more information objects that were open for the identified stored task, identify one or more information objects that are currently open for the current task, determine an additional information object that was open for the identified stored task but is not currently open for the current task, and provide a recommendation to a user to open the additional information object.

In another general aspect, a computer implemented method is provided that includes storing one or more tasks, each task including one or more knowledge actions (KAs) that includes an action of one of a plurality of KA types being performed on an information object, determining a degree of similarity between each of one or more of the stored tasks and a current task, identifying at least one of a plurality of the stored tasks that most closely matches the current task based on the degree of similarity for each of the one or more stored tasks, identifying one or more information objects that were open for the identified stored task, identifying one or more information objects that are currently open for the current task, determining an additional information object that was open for the identified stored task but is not currently open for the current task, and providing a recommendation to a user to open the additional information object.

In another general aspect, an apparatus includes storing logic configured to store one or more tasks, each task including one or more knowledge actions (KAs) that includes an action of one of a plurality of KA types being performed on an information object, similarity determination logic configured to determine a degree of similarity between each of one or more of the stored tasks and a current task, match determination logic configured to identify at least one of a plurality of the stored tasks that most closely matches the current task based on the degree of similarity for each of the one or more stored tasks, open information object identification logic configured to identify one or more information objects that were open for the identified stored task, the open information object identification logic also configured to identify one or more information objects that are currently open for the current task, object determination logic configured to determine an additional information object that was open for the identified stored task but is not currently open for the current task, and recommendation logic configured to provide a recommendation to a user to open the additional information object.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
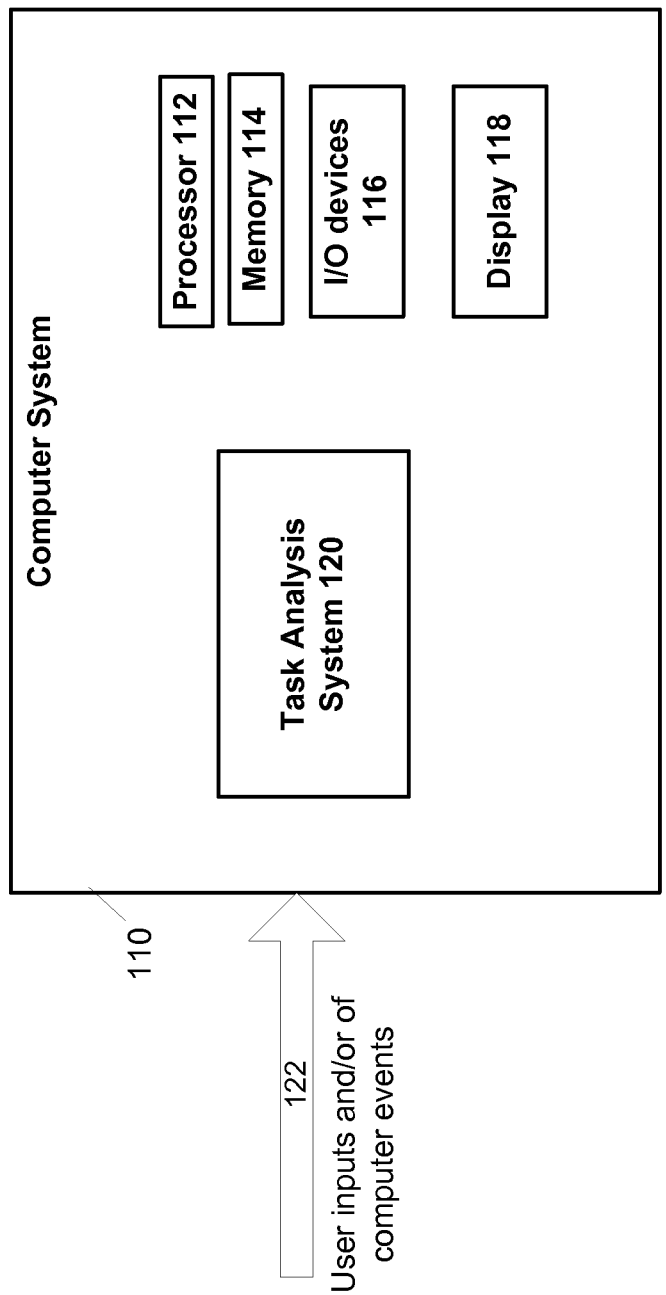
FIG. 1 is a block diagram illustrating a computer system 110 according to an example implementation.

According to one example implementation, FIG. 1 is a block diagram illustrating a computer system 110 according to an example implementation. Computer system 110 may include a processor 112 for processing information and executing instructions, memory 114 restoring information, one or more input/output (I/O) devices 116, and the display 118 for displaying information to a user. I/O devices 116 may include a mouse, a trackball, a touchpad, or other pointing device a keyboard, or any other input or output device. Computer system 110 also includes a task analysis system 120 for identifying or mining tasks and/or providing a task-related recommendation to a user. One or more user inputs and/or computer events may be, for example, input by a user and received or detected by task analysis system 120 of computer system 110. Computer events received via line 122 may include any type of computer event such as a user interacting with computer system 110 such as, for example, a user typing text, characters or other information, a user selecting one or more items or objects via a point and click with a mouse or other input device, one or more gestures made by a user on an input device or touchpad such as swiping across a touchpad, tapping on a touchpad, rotating or shaking an input device, etc., or other gestures made by a user. Computer events received via line 122 may also include screens, displays, files or pages, such as webpages or files, and other information shown or displayed to a user, e.g., via display 118. Thus, the computer events received via line 122 may include a variety of user interactions with computer system 110, including user input events that are input by a user, and output events that are output or displayed to a user.

According to an example implementation, task analysis system 120 may receive a list of computer events, and determine one or more desktop operations, with each desktop operation including one or more computer events that are performed to accomplish the desktop operation. Task analysis system 120 may determine one or more knowledge actions, where each knowledge action includes one or more desktop operations performed using a same application on a same information object. Task analysis system 120 may then determine one or more tasks, with each task including a group of knowledge actions that include information objects that are semantically related. Task analysis system 120 may then combine two or more tasks that are temporally related. In an example implementation, task analysis system 120 may also analyze one or more of events of one or more stored tasks, and may display or provide a proposal or recommendation to a user to open an additional information object that is not currently open based on the events of a current or active task for the user.

A desktop operation may be a user-system interaction, and may include one or more computer events. For example, a computer events may include a user performing an action associated with the computer system 110, such as selecting an item within a user interface, selecting a file or folder, typing in a letter, word, or inputting other information, a user inputting a gesture (e.g., swiping or tapping or twisting a touchpad or other user input device), typing in a URL or uniform resource locator or other resource locator, etc. Also, computer events may include the display of screens, UIs (user interfaces), text and other information to the user, e.g., via display 118.

In example implementations, desktop operations may be performed on one or more objects. An object may include, for example, an application (e.g., open an application), a file (e.g., create, save, delete or open a file), a folder (e.g., open or close or create a folder), an information object (e.g., portion of text or information), and a window.

An application is a piece of software that can be run in the computer environment or on computer system 110 and may be used to transform information. An operating system process is an example of a running instance of an application. Other applications may be used such as a web browser, a text editor or word processor application, a spreadsheet application, etc. A file may be, or may include, a single resource of information. Files may be accessed using applications and are stored on a drive, for example. A folder may be used to organize files. A folder may store or encapsulate a number of files. Information objects may include pieces of information presented to the user. This includes, for example, textual information represented by a string of characters, or non-texutal information (e.g., graphical information). Information objects can be stored within a file, and may include an entire file, or merely a portion of a file, as examples.

Table 1 below illustrates some example desktop operations and objects upon which the desktop operation is performed.

TABLE 1

Example desktop operations and objects

| Opr | Obj | | | | |
|---|---|---|---|---|---|
| | Application | File | Folder | Information Object | Window |
| Open | x | x | x | | |
| Close | x | x | x | | |
| Save | | x | | | |
| Rename | | x | x | | |
| Delete | | x | x | x | |
| Cut | | x | x | x | |
| Paste | | x | x | x | |
| Print | | x | | | |
| Create | | x | x | x | |
| Execute | x | | | | |
| Focus | | | | x | x |

As shown in Table 1, example desktop operations may be performed on one or more objects. Objects may include an application, a file, a folder, an information object and a window. Example desktop operations may include open, close, save, rename, delete, cut, paste, print, create, execute and focus. For example, as shown in Table 1, a user may open, close or execute an application. A user may open, close, save, rename, delete, cut, paste, print or create a file. A user may open, close rename, delete, cut, paste, create or focus on a folder. A user may delete, cut, paste, or create an information object. And, a user may focus a window (where focus may include selecting and/or raising the item or window to the top level of objects on a desktop, for example).

A desktop operation (DO) may include one or more computer events. In some example embodiments, the events for a desktop operation are performed by a same application on a same object. Thus, a user may perform several computer events to accomplish or perform a desktop operation. For example, to perform the desktop operation of creating a file, a user may select an application, select a "new" button or icon in the application menu to create a new file, and type in the name of the new file to be created. The user may select the "save" button on the application menu to perform the desktop operation of saving a file. These are merely two examples, and others may be provided or performed.

Knowledge actions (KAs) are techniques applied to execute working tasks. A knowledge action may include a group of one or more desktop operations performed using a same application on a same information object. These techniques are tangible subgoals that support execution of a task. Some example KAs (or KA types) include: consuming, authoring, communicating, organizing and browsing. Consuming: A user or knowledge worker may focus a resource on the computer desktop and focuses his attention to the visual representation of an information object, and may read or review the information, for example. Authoring: A user or knowledge worker may create a representation of information in an existing or new resource through a knowledge transformation process, or may create a document or information object, as examples. Communicating: A user or knowledge worker may share information with others, e.g., by preparing and sending an email, a chat message, or other communication, as examples. Organizing: A user or knowledge worker organizes existing information resources, such as a user creating and organizing folders, moving files between folders, etc. Browsing: A user or knowledge worker may search for and review sources of information, e.g., files, web pages, and other information. These are merely some example KAs (or KA types), and other KAs may be used.

A task may be a goal of a user (e.g., to create a specific kind of document), and a task may include one or more knowledge actions.

Figure 2:
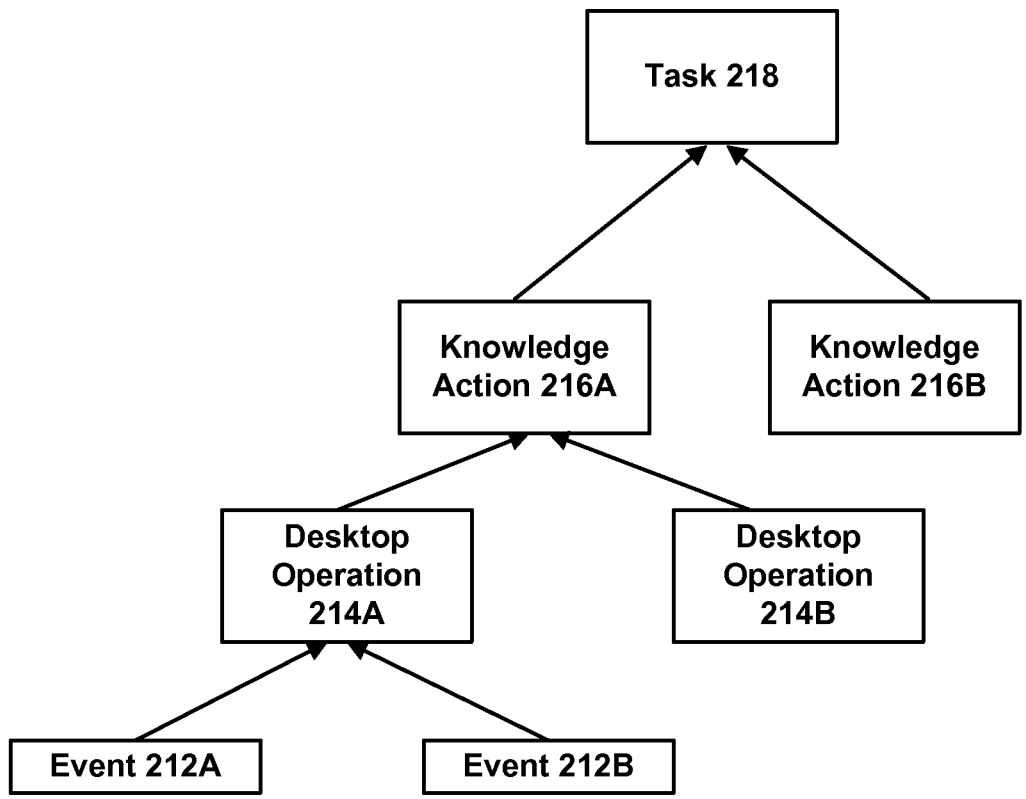
FIG. 2 is a diagram illustrating a hierarchical relationship of events, desktop operations, knowledge actions, and tasks according to an example implementation.

FIG. 2 is a diagram illustrating a hierarchical relationship of events, desktop operations, knowledge actions, and tasks according to an example implementation. According to an example implementation, a list of computer events may be received and stored in memory. The stored events may include for example, events 212A and 212B. Desktop operation 214A may include computer events 212A and 212B, which may be performed using a same application on a same information object. Knowledge action 216A may include a group of desktop operations including desktop operation 214A and desktop operation 214B that may be performed using a same application on a same information object. A task 218 may include one or more knowledge actions, such as knowledge actions 216A and 216B.

Figure 3:
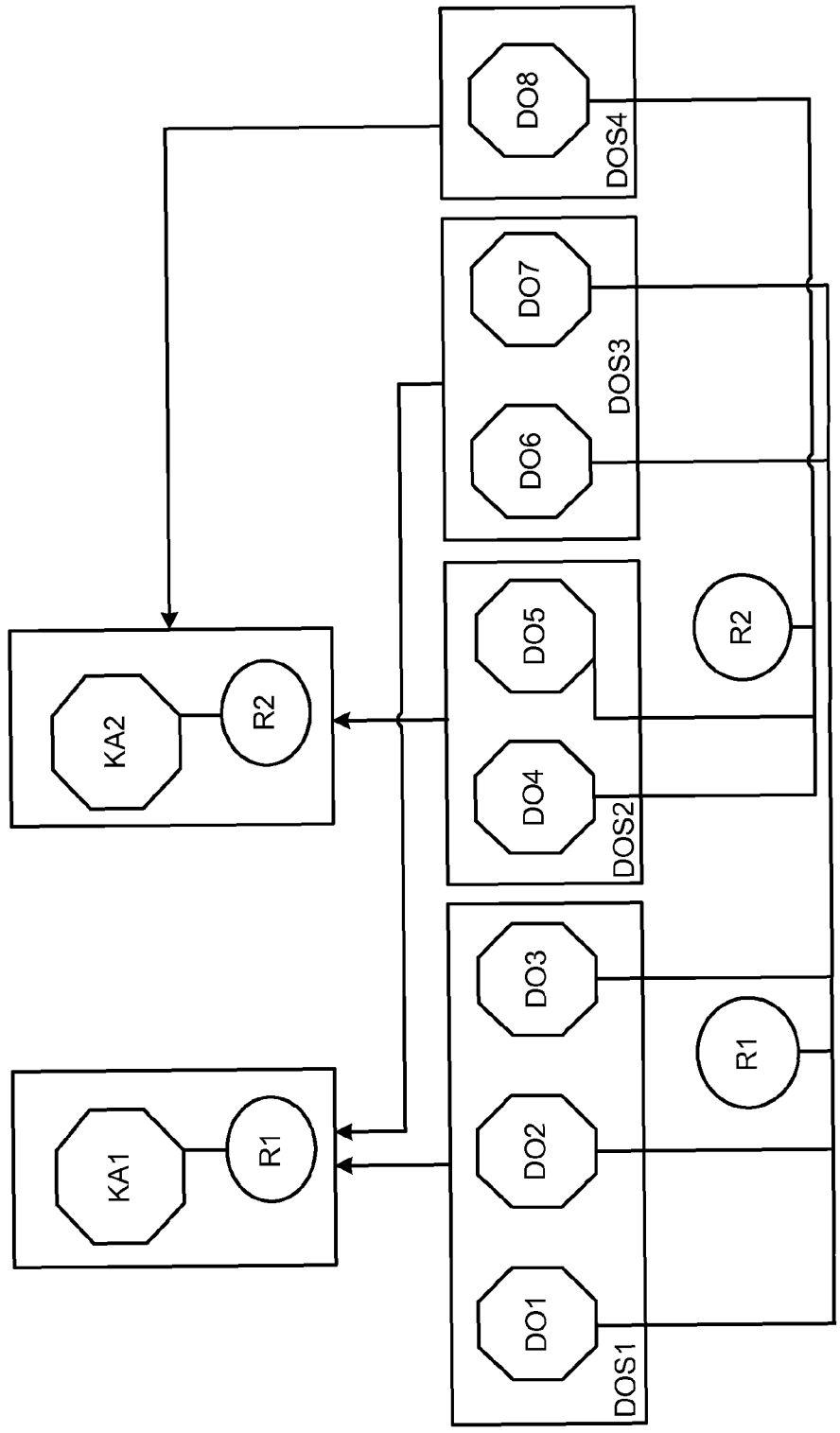
FIG. 3 is a diagram illustrating how desktop operations operating on a same resource may be combined as a single knowledge action according to example implementations.

FIG. 3 is a diagram illustrating how desktop operations operating on a same resource may be combined as a single knowledge action according to example implementations. As shown in FIG. 3, two resources (e.g., information objects) are shown including R1 and R2. Several desktop operation sequences (DOSs) are shown including desktop operation sequences DOS1, DOS2, DOS3 and, and DOS4. DOS1 includes a sequence of desktop operations (DOs), including DO1, DO2 and DO3, which are performed on resource (or information object) R1 DOS2 is a sequence that includes DO4 and DO5 that are performed on resource R2. DOS3 includes DO6 and DO7 that are performed on resource R1. And, DOS4 includes DO8 that is performed on resource R2. Therefore, desktop operations DO1, DO2, DO3, DO6 and DO7 are performed on resource R1 and are included within knowledge action 1 (KA1). Desktop operations DO4, DO5 and DO8 are performed on resource R2 and are included within KA2, for example.

According to an example implementation, one or more desktop operation sequences (DOSs) may be determined, with each DOS including one or more desktop operations performed by a common or same application on a common or same resource or information object. Next, unclassified knowledge actions may be created or determined. For example, sets of desktop operation sequences (DOSs) may be determined or created that are provided or performed to accomplish the same knowledge action, where the desktop operations of a knowledge action (KA) are performed using a same or common application on a same or common information object. For example, knowledge actions of a duration less than a threshold time period (e.g., KA time period less than 6 seconds) may be filtered or deleted. Next, each KA is classified as one of a plurality of KA types. Some example KA types include: consuming, authoring, communicating, organizing and browsing. The knowledge action (KA) may be classified based on the desktop operations that it contains. For example, the desktop operation "Creating"—"Information Object", indicates a knowledge action of the type "Authoring." As another example, the desktop operation of "Renaming"—"Folder" indicates or is associated with the knowledge action of "Organizing." In this manner, each different type of desktop operation may be mapped to a knowledge action (KA) type.

According to an example implementation, two or more KAs may be analyzed to determine if the information objects of KAs are semantically related, e.g., whether semantics and/or content of an information object of a first KA is semantically related to an information object of a second KA. A task is then created or determined that includes two or more semantically related KAs, for example. Also, even though KAs of different tasks may not be semantically related, these KAs or tasks may be combined into a single task if the two tasks are temporally related (or KAs occur near each other in time, or other temporal relationship that indicates these KAs should be classified as part of the same task). Finally, according to another example implementation, task analysis system 120 may display or provide to a user a recommendation to open an additional information object that is not currently open based on a comparison of a current or active task to one or more stored tasks. Further example details are provided herein.

Figure 4:
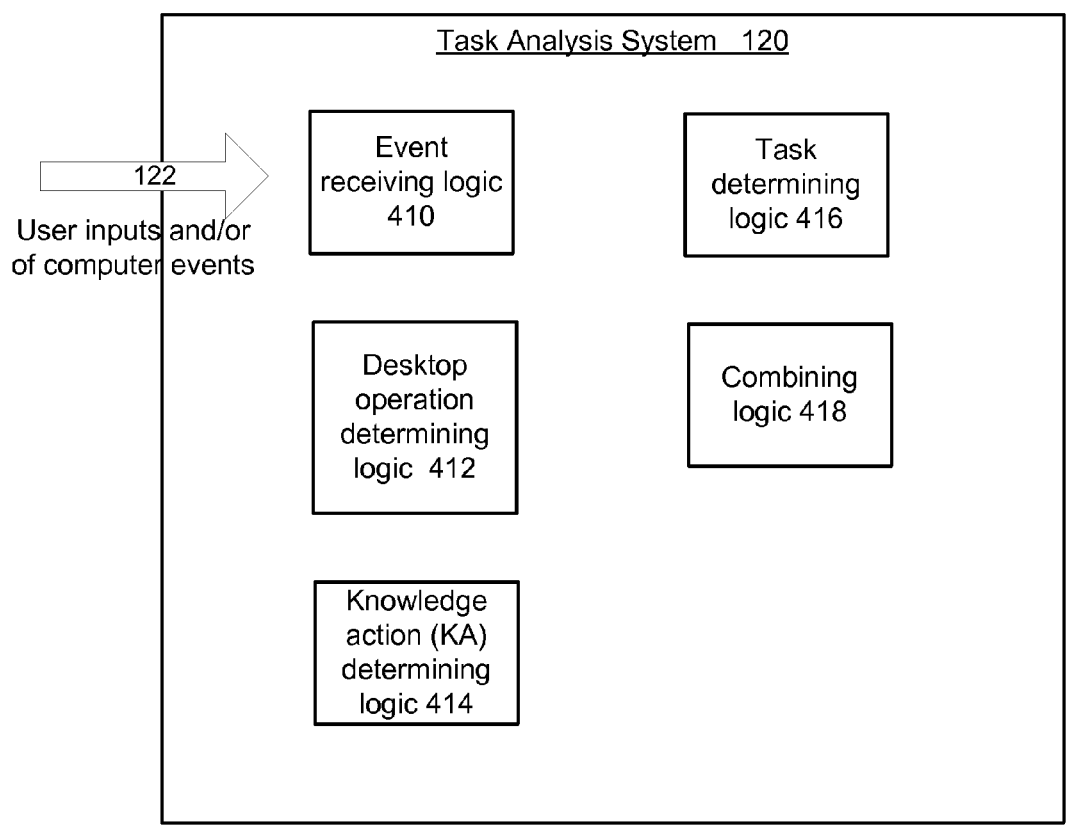
FIG. 4 is a block diagram illustrating task analysis system 120 according to an example implementation.

FIG. 4 is a block diagram illustrating task analysis system 120 according to an example implementation. An event receiving logic 410 is configured to receive a list of computer events, each event including as user interacting with a computer. A desktop operation determining logic 420 is configured to determine one or more desktop operations, with each desktop operation including one or more computer events that are performed to accomplish the desktop operation. A knowledge action determining logic 414 is configured to determine one or more knowledge actions, where each knowledge action includes a group of one or more desktop operations performed using a same application on a same information object. A task determining logic 416 is configured to determine one or more tasks, with each task including a group of knowledge actions that include information objects that are semantically related. And, a combining logic 418 is configured to combine two or more tasks that are temporally related.

Figure 5:
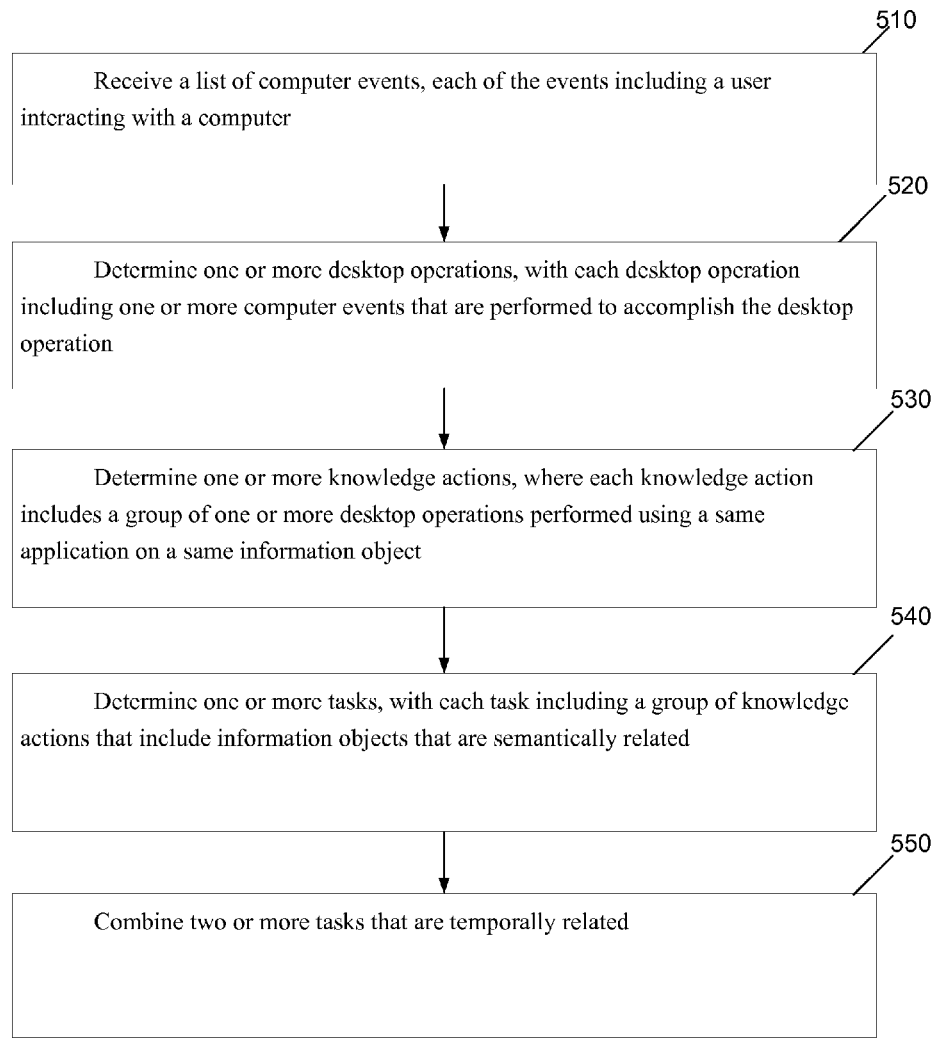
FIG. 5 is a flow chart illustrating operation of task analysis system 120 according to an example implementation.

FIG. 5 is a flow chart illustrating operation of task analysis system 120 according to an example implementation. Operation 510 may include receiving a list of computer events, each of the events including a user interacting with a computer. Operation 520 may include determining one or more desktop operations, with each desktop operation including one or more computer events that are performed to accomplish the desktop operation. For example, computer events are reported to task analysis system 120 via input or line 122. Events performed by a same application on a same information object may be grouped into a desktop operation, for example.

Operation 530 may include determining one or more knowledge actions, where each knowledge action includes a group of one or more desktop operations performed using a same application on a same information object. Operation 540 may include determining one or more tasks, with each task including a group of knowledge actions that include information objects that are semantically related. Operation 550 may include combining two or more tasks that are temporally related.

For example, a user may perform a number of desktop operations within an example work day. First a user may perform several desktop operations related to editing a Word document, such as opening a Word document and performing edits, and then saving the Word document. Later, the user may also perform one or more desktop operations related to reserving travel reservations for an upcoming trip to europe. For example, the user may browse and/or consume different websites related to europe. While searching for information on various european destinations and cities, the user may open and consume a new browser window to view a currency conversion website to determine, for example, a current dollar to euro conversion rate. After reviewing the currency conversion website, the user may resume his search and review of european destinations and cities. As part of this process, the user may then make air travel and hotel reservations for his trip from the U.S. to europe using one or more hotel, airline or travel websites. For example, over a 30 minute period a use may switch multiple times between the travel reservation website(s) and currency conversion website(s).

For example, the desktop operations for a user may include the following example desktop operations, where desktop operations performed by a common (or same) application on a common or same information object are grouped into one knowledge action (KA). The assignment to different KAs (KA1, KA2, . . . ) are shown below for each of the desktop operations listed below.

1) Open: Word_file_1—9:15 AM (KA 1)
2) Perform Edits to Word_file_1—9:15 AM-10:44 AM (KA 1)
3) Save Word_file_1—10:44 AM (KA 1)
4) Focus: travel-website_1—10:48 AM (KA 2)
5) Focus: travel-website_2—10:50 AM (KA3)
6) Focus: travel-website_1—10:51 AM (KA2)
7) Focus: currency-conversion-website_1—10:51 AM (KA4)
8) Focus: travel-website_1—10:53 AM (KA 2)
9) Focus: currency-conversion-website_1—10:54 AM (KA4)
10) Focus: travel-website_2—10:59 AM (KA3)
11) Focus: currency-conversion-website_1—11:03 AM (KA4)

Therefore, in the example desktop operations shown above, the user performed desktop operations of KA1 (knowledge action 1) from 9:15 AM until 10:44 AM. Then, between 10:48 and 11:03 AM, the user switched between KAs in the order: KA2, KA3, KA2, KA4, KA2, KA4, KA3, KA4. This is merely an example. Where KA2 involves travel-website_1 (as a resource or information object), KA3 involves travel-website_2, and KA4 involves currency-conversion-website_1. This is merely one example and others may be used.

As shown by operation 540, one or more tasks may be mined or determined, with each task including a group of knowledge actions that include information objects that are semantically related. For example, task analysis system 120 may perform semantic analysis on pairs of the information objects for KA1, KA2, KA3 and KA4, for example, to determine if any of these KAs are semantically related.

For example, Word_file_1 may be a Word file that is a 5-page essay on an endangered species. On the other hand, travel-website_1 and travel-website_2 may be travel websites that allow a user to make hotel, airline and rental car reservations, for example. Therefore, in performing semantic analysis of these three information objects, task analysis system 120 may determine that travel-website_1 and travel-website_2 are semantically related, and that Word_file_1 is not semantically related to travel-website_1 or travel-website_2. The computer events may include the full text of the Word file that is edited or displayed, or the text/information displayed on the web page of the travel-website_1 or travel-website_2, for example.

A variety of different techniques may be used to determine if two or more KAs (and/or information objects, events and/or desktop operations associated therewith) are semantically related, including: vector space method, topic extraction method, term matching method, vector space model method, latent dirichlet allocation method, and/or hierarchical clustering method. These are just a few example techniques that may be used to determine, for example, if information objects of two or more KAs are semantically related. In this manner, two or more KAs may be grouped or combined to form or create a task.

Therefore, semantics may provide one basis for grouping KAs together to create a task. For example, two or more KAs may be combined to form a task if the KAs (or information objects of each of the KAs) are semantically related. In addition, according to an example implementation, two or more tasks may be combined to form one task if there is a temporal relationship between the tasks, even though the two tasks (or their information objects) are not semantically related. Therefore, time or temporal relationship(s) between tasks may provide another basis for grouping or combining or merging tasks into a single task. For example, in the travel example described above, KA2 and KA3 relate to search and review of travel websites, e.g., to book airfare and/or hotel reservations (according to this example). Thus, task 1 may be created or determined to include KA2 and KA3 since the information objects (e.g., the travel websites) of KA2 and KA3 may be determined to be semantically related. However, KA4 relates to currency conversion and calculation for all currencies, e.g., currency calculation using currency-conversion-website_1. Therefore, according to an example, task analysis system 120 may determine that KA4 is not semantically related to KA2 or KA3, and therefore, KA4 would not be initially assigned to task 1 on the basis of semantics. Rather, KA4 may be initially assigned to a different task, e.g., task 2. However, as noted above, time or temporal relationships between tasks may provide another basis for combining or merging two tasks into a single task. For example, if the desktop operations or events of each task indicate that the user was switching between the two tasks, or back and forth between the tasks, e.g., a minimum number of switches between tasks within a period of time, then the task analysis system 120 may combine or merge these two tasks into a single task based on their temporal relationship.

For example, a group of KAs may be assigned to different tasks based on semantics. For example, two may be assigned to one task if the KAs (or information objects of such KAs) are semantically related. Temporal relationships may then be used to combine different tasks that are not semantically related. For example, task 1, task 2 and task 3 may be considered temporally related if one or more desktop operations for each task occurred in the following example order (e.g., within a certain time period, such as 20 minutes): task 1, task 2, task 3, task 1, task 2, task 3. Therefore, in this example, the tasks: task 1, task 2 and task 3 may be considered to be temporally related or interwoven (e.g., based on the switching between different events of these tasks over a relatively short period of time), based on the received computer events for each task.

As another example, as noted above, the user switches between KAs in the following order: KA2, KA3, KA2, KA4, KA2, KA4, KA3, KA4, between 10:51 and 11:03 AM. Therefore, the desktop operations for KA2, KA3 and KA4 are temporally related or interwoven. Thus, the rapid or frequent switching between KA4 (related to currency conversion) and both KA2 and KA3 (travel websites) suggests or indicates that the currency conversion KA (KA4) should be assigned to the same task as KA2 and KA3 (review of travel websites), since the user was performing this KA (KA4) during the same short time interval as the other KAs (KA2, KA3). This temporal relationship, or interwoven nature of task 2 (including KA4) and task 1 (including KA2 and KA3) (e.g., within a limited period of time) indicates that task 2 (including KA4) may or should be considered as part of the same task (from a user perspective) as task 1 (KA2 and KA3), for example. Thus, for example, there are a minimum of 3 task switches (switches by a user between events or desktop operations of different tasks) within a 20 minute time period between task 2 (including KA4) and task 1 (KA2 or 3) that indicates that task 1 and task 2 are temporally (or time) related. This example is merely one example, and the teachings and description of this disclosure are not limited thereto. Other examples may be used.

Thus, to summarize this example, KA2 and KA3 may be assigned to task 1 based on the semantic relationship between the information object of KA2 to the information object (or resource) of KA3. KA4 may be assigned to a different task, task 2, since KA4 is not semantically related to KA2 or KA3, according to this example. However, as noted above, task 1 (including KA2 and KA3) is temporally related to task 2 (including KA4). Therefore, task 1 and task 2 may be combined to form a single task based on the temporal relationship between task 1 and task 2. For example, to combine task 1 with task 2, the KAs of task 2 may be added to task 1, and task 2 may then be deleted or removed. This is merely one example in which two tasks are combined to provide one task based on a temporal relationship between the two tasks.

With reference to the flow chart of FIG. 5, the computer events may include one or more of the following: a user entering text into an application; a user entering non-textual information into an application; a user selecting an object displayed on a user interface; a user inputting a gesture into a computer; and display of a display object, a screen or a user interface.

With reference to the flow chart of FIG. 5, each of the desktop operations may be one type of a plurality of desktop operation types that includes: open, close, save, rename, delete, cut, paste, print, create and execute.

With reference to the flow chart of FIG. 5, each of the desktop operations may be performed on or with respect to an application, a file, a folder, an information object or a window.

With reference to the flow chart of FIG. 5, each of the desktop operations may include one or more events that are performed by a same application on a same information object.

With reference to the flow chart of FIG. 5, the determining one or more tasks may include determining one or more tasks, with each task including a group of semantically related knowledge actions, wherein one or more of the following techniques are used to determine if two or more tasks are semantically related: vector space method; topic extraction method; term matching method; vector space model method; latent dirichlet allocation method; and/or hierarchical clustering method.

With reference to the flow chart of FIG. 5, the combining two or more tasks may include combining two tasks into a single task if a number of task switches between the two tasks over a time period is greater than a threshold, wherein a task switch includes a switch by a user between computer events or desktop operations of the two tasks.

With reference to the flow chart of FIG. 5, the combining two or more tasks may include determining a number of task switches for different pairs of tasks of a plurality of tasks, identifying two tasks out of the plurality of tasks that have the most task switches between them over a period of time as compared to other task pairs of the plurality of tasks, and combining the two identified tasks into a single task.

In addition, task identification system 120 (FIG. 1) may include a recommender service to recommend or propose to a user to open one or more information objects based on a comparison of an active task to one or more stored tasks, according to an example implementation. According to an example implementation, one or more tasks may be stored in a memory or storage device, including the events, desktop operations and KAs associated with or assigned to each task. For example, each of the tasks (including events, desktop operations and tasks assigned to each of the tasks) are received and stored in a memory or storage device. Task analysis system 120 may then compare a current or active task for a user to one or more stored tasks, and may determine a degree of similarity between the current or active task for a user to one or more stored tasks for the user. For example, task analysis system 120 may determine which of the stored tasks most closely resembles a current or active task.

There are many different ways in which task analysis system 120 may compare a current or active task to one or more stored (or previous) tasks, or to determine which stored task most closely resembles a current or active task for a user. A series of events or desktop operations received by task analysis system 120 over a recent time period (e.g., events or desktop operations received over last 30 minutes, over last 2 hours, over last 4 hours, or other time period), and these recent events or desktop operations may be considered part of a current or active task. According to one example implementation, task analysis system 120 may identify one or more (or all) of the information objects that are currently open, or which were open during a recent time period, or which were open for the current task. The task analysis system 120 may then determine which stored task had the most (or highest percentage of) open information objects that match the one or more open information objects for the current or active task (or were open over a specific time period or window for the current task).

Or, according to another example technique to determine which stored or previous task most closely resembles a current or active task, the task analysis system 120 may identify the number of KA switches (which may include switches between information objects of different KAs) over a time period, or an average KA switching rate for the current or active task. The task analysis system may perform a similar calculation for each stored or previous task, e.g., calculate the KA switching rate or number of KA switches (switches between information objects of different KAs) over a time period for each stored task. Task analysis system 120 may then identify the stored task that most closely resembles the current or active task as the stored task that has the number or KA switches or KA switching rate that most closely resembles or most closely matches the KA switching rate or number of KA switches for the current or active task for the user.

Alternatively, a combination or plurality of criteria may be used to determine the stored task that most closely resembles a current or active task. For example, task analysis system may be determine a stored or previous task that most closely resembles a current or active task based on: 1) which stored or previous task had open applications that most closely match the opened applications for the current or active task; 2) which previous or stored task had (e.g., the most or the highest percentage of) information objects that were open for the previous task that match or are the same as open information objects for the current task, and 3) based on the KA switching rate for the previous tasks as compared to the KA switching rate for the current or active task. Other criteria may be used as well, as these are merely a few examples.

Once a stored or previous task has been identified that may most closely matches or resembles a current or active task for a user, the recommender service of task analysis system 120 may determine if there are any information objects that were opened for the matching or identified task that are not currently open or are not open in the current or active task. The recommender service of task identification system 120 may then provide or display a recommendation to open one or more of these currently unopened information objects (or files) that were opened for the identified (or most closely matching) previous or stored task. For example, if a current task is the same or very similar to a previous or stored task, the recommender service may provide a recommendation or proposal to open any unopened information objects that were previously opened as part of that matching previous task, for example. This may assist the user in opening all of the information objects related to a current or active task, for example.

With reference to the flow chart of FIG. 5, the method of FIG. 5 may further include identifying one or more information objects that are open within a time window, determining a task that includes the identified information objects associated with the determined task, determining an additional information object that is associated with the determined task but is not currently open, and displaying a proposal or recommendation to open the additional information object.

With reference to the flow chart of FIG. 5, the method of FIG. 5 may further include storing one or more tasks, determining an amount of switches between knowledge actions for an active task within a time window, determining one or more open information objects for the active task within the time window, identifying one of a plurality of the stored tasks that most closely matches or resembles the active task based on the open information objects and a number or frequency of knowledge action switches for one or more of the plurality of stored tasks as compared to the active task, determining an additional information object that is associated with the identified stored task but is not currently open, and providing a proposal or recommendation to a user to open the additional information object.

Figure 6:
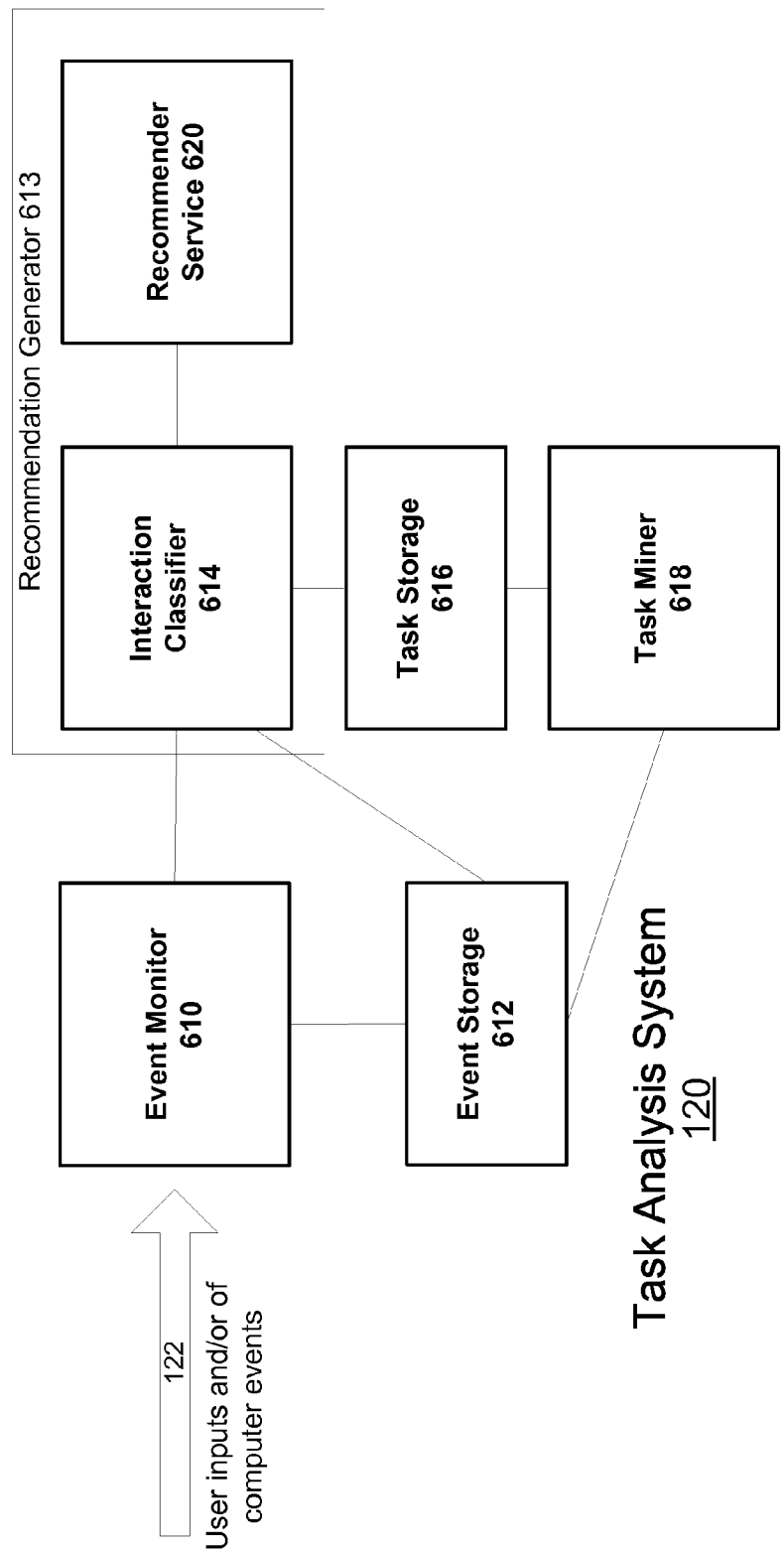
FIG. 6 is a block diagram illustrating a task analysis system 120 according to another example implementation.

FIG. 6 is a block diagram illustrating a task analysis system 120 according to another example implementation. Task analysis system 120 may include an event monitor 610 that may receive one or more computer events. These received computer events are stored in an event storage 612, which may include memory or a storage device, for example.

A task miner 618 receives the stored computer events, and identifies desktop operations as a group of one or more events, and determines one or more knowledge actions (KAs), e.g., where each KA includes a group of one or more desktop operations performed on or by a same application on a same information object. Task miner 618 also determines one or more tasks, with each task including a group of KAs that are semantically related (e.g., where knowledge actions of the task include information objects that are semantically related). The task miner 618 may also then analyze the temporal or time relationships of different tasks, and may combine tasks together into a single task if the tasks are temporally related, for example. For example, KAs of two different tasks may be combined into a single task if the two tasks are temporally related. After identifying tasks based on semantic relationships and temporal relationships, task miner 618 stores the tasks, or information regarding the tasks, in task storage 616.

A recommendation generator 613 may provide a recommendation or proposal to a user to open an information object based on a current or active task for a user received via event monitor 610 as compared to one or more (previous) tasks stored in task storage 616. Recommendation generator 613 may include an interaction classifier 614 and a recommender service 620. According to an example implementation, interaction classifier 614 may compare events, desktop operations and knowledge actions of a current or active task to the events, desktop operations and knowledge actions of one or more stored tasks to identify a stored (or previous) task that most closely matches or most closely resembles the current or active task. As noted above, interaction classifier 614 may use different criteria for identifying a stored task that most closely resembles or matches a current or active user task. For example, interaction classifier may compare KA switching rate or KA switching frequency (or the number of switches between knowledge actions) for the current task compared to one or more stored tasks, or may compare the applications and information objects that are open or used for the current task as compared to one or more stored or previous tasks, or the knowledge actions that are part of one or more previous tasks as compared to the knowledge actions that are part of the current task. Based on one or more criteria, the interaction classifier 614 may identify a previous or stored task that most closely matches or most closely resembles a current or active task for a user.

Recommender service 620 may then identify a list of the information objects that were used by the matching stored task, and may identify one or more of these information objects that are not currently open, or which are not open over a recent time period or window for the current or active task. Recommender service 620 may then provide or display to the user a recommendation to open one or more of these unopened information objects (e.g., information objects used by the matching task which were not opened for the current or active task).

Various further details and example implementations of the recommendation generator 613 will now be described.

According to an example implementation, one or more tasks, including the associated events, desktop operations (DOs) and knowledge actions (KAs) for each task, are received and stored in task storage 616. This information for previous tasks may be used by recommendation generator 613 to make a recommendation to open one or more information objects for a current task.

Computer events, desktop operations (DOs) and KAs for a current task may be received via event monitor 610, stored in event storage 612, and then provided to recommendation generator 613. Alternatively, the events, DOs, and KAs of a current task may be received by event monitor 610 and provided directly to recommendation generator 613 for storage and/analysis. In one example implementation, all events, DOs and KAs received over a recent time window, e.g., received over the last 30 minutes, received over the last 60 minutes, or received over the last 2 hours (as some example time windows), etc., may be considered or assumed to be part of the current task for a user. This is a simplified approach in which recommendation generator 613 assumes that all or most of the computer events received over a recent time window for a user are performed as part of the same (current) task for that user.

Alternatively, the computer events received over or for a recent time window (e.g., received over last 60 minutes) may be provided to task miner 618, and one or more KAs may be identified for this recent time window, e.g., by task miner 618 or interaction classifier 614. According to this example implementation, the KAs for computer events received over a recent time window may be grouped together as a current task if the KAs include information objects that are semantically related, for example.

According to an example implementation, interaction classifier 614 may determine a degree of similarity between each of one or more of the stored tasks and the current task. Based on these degrees of similarity for each stored task, interaction classifier 614 may identify or select one or more stored tasks that most closely match a current task. Determining a degree of similarity for each of the stored tasks with respect to a current task may be performed in a number of different manners or using different techniques. For example, a degree of similarity may be determined for each stored task as compared to the current task based on at least one or: 1) information objects that were open for both the current task and the stored task, and/or 2) KAs that were part of both the current task and the stored task. Each KA may include an KA type or action type (such as authoring, consuming, communicating . . . ), and an information object on which the action is performed for the KA.

According to another example implementation, the degree of similarity for each stored task as compared to the current task may be determined based on at least one of: 1) a number or percentage of information objects that were open for the stored task that were also open during a time window of the current task, and 2) a number or percentage of the KAs that were part of the stored task that were also part of the current task, where a KA being included or part of a stored task and a current task includes the same KA type operating on a same information object.

For example, a degree of similarity may be determined as a similarity value, which may be a value between 0 and 1, for example. This is merely an example, and a similarity value may be measured in a number of different manners and may be any value. According to one example implementation, a similarity value may be determined for each stored task based on a number or or percentage of information objects that were open for the stored task that are also open for the current task (or were open for the current task within a recent time window, e.g., within the past 60 minutes). For example, of the 5 information objects that were open for a first stored task, if 3 of these information objects are also open for the current task, then this information may be used to determine or calculate an example similarity value of ⅗, or 60%, or 0.6. Likewise, a second stored task may have 8 open information objects, where 4 of the 8 information objects that were also open for the current task, resulting in a similarity value for the second stored task of ⅘ or 50% or 0.5. In this example, using the information objects as a criteria for determining a degree of similarity or similarity value, the first stored task has a higher degree of similarity or a higher similarity value (0.6) than the second stored task (similarity value of 0.5). Thus, the first stored task more closely matches the current task, according to an example implementation.

According to another example implementation, a similarity value may be determined for each stored task based on a number or percentage of the KAs that were part of the stored task that were also part of the current task, where a KA being included or part of a stored task and a current task includes a same KA type (e.g., authoring, consuming, communicating, . . . ) operating on a same information object. Thus, the KA criteria for determining a stored task(s) that most closely match a current task is a more strict or more challenging criteria than using information object alone, since KA criteria requires a match of both the information object and the KA type. If a third stored task includes 4 KAs and only 1 of these 4 KAs were part of the current task (where both the stored task and the current task included the same KA type operating on a same information object), then this results in a similarity value for the third stored task of ¼ or 0.25. A fourth stored task may have 5 KAs, and 4 of these 5 KAs may be part of the current task, resulting in a similarity value of ⅘ or 0.8 for the fourth stored task. In this example, the fourth stored task more closely matches the current task, as compared to the third stored task, based on a higher similarity value (0.8 vs. 0.25).

Thus, information objects that are part of both a stored task and a current task may be used as a criteria to determine similarity values for each stored task, and based upon the similarity values, to determine which stored task(s) most closely matches a current task. Alternatively, KAs that are part of both a stored task and a current task may be used as a criteria for determining a similarity value for each stored task, and based upon these similarity values, determining which of the stored tasks most closely matches or resembles the current task for a user, e.g., by comparing the similarity values for each stored task and selecting one or more of the stored tasks that have the highest or higher similarity value(s). A KA may include both a KA type or KA action (e.g., authoring, consuming, communicating) and an information object. There are merely some example criteria. Other criteria may be used to determine a similarity value or determine a degree of similarity, or for determining which stored task(s) most closely resembles a current task.

Thus, for a KA to be part of the stored task and the current task requires both the information object and the KA type/KA action to be the same. Thus, KAs may be a more challenging or more strict criteria than information objects. For example, when using information objects as a criteria, the action performed on the information object or KA type does impact or affect the similarity values, and KA types or action types can be different, e.g., a first information object may be authored for a first stored task and that same information object may be consumed by a current task, and this information object may be considered a match between the current task and the first stored task, thereby increasing a similarity value for the first stored task. On the other hand, if KAs are used as a criteria to determine a similarity value or to determine the stored task that most closely matches the current task, a matching KA (between a stored task and a current task) requires both the information object and the KA type (or action type) to match between the stored task and the current task. Thus, in general, similarity values may be lower when using KAs as a criteria as compared to using information objects as a criteria. These are merely examples, and other criteria may be used.

According to an example implementation, a stored task(s) may be identified or selected that most closely matches the current task as the stored task (or tasks) that has the highest similarity value. Alternatively, one or more stored tasks may be identified or selected that most closely match the current task by identifying or selecting one or more stored tasks that have similarity values that are greater than a threshold similarity value, e.g., identify or select those stored tasks that have a similarity value that is greater than 0.5, for example. This is merely an example and any threshold may be used.

Therefore, according to an example implementation, a stored task or stored tasks may be selected that most closely match(es) the current task. For example, the stored task having the highest similarity value may be selected, or one or more stored tasks that have a similarity value that exceeds a threshold may be selected. As a result, in the event that a threshold similarity value is used (where all stored tasks having a similarity value that exceeds a threshold are selected), using KA types as a criteria for determining similarity values may result in fewer but higher quality recommendations provided by recommendation generator 613, since fewer stored tasks may be identified or selected.

After one or more stored tasks have been identified or selected that most closely match the current or active task, recommender service 620 may: identify one or more information objects that were open for the identified stored task, identify one or more information objects that are currently open (or were open during a time window) for the current task, compare the two lists of information objects, and determine an additional information object(s) that was open for the identified stored task but is not currently open for the current task, and provide a recommendation to a user to open the additional information object(s). The recommendation may be displayed to a user and may, for example, identify the proposed or recommended information object, e.g., include a link, a URL (uniform resource locator) or other resource identifier that allows the user to open or access the recommended information object.

According to an example implementation, recommender service 620 may determine a degree of confidence for each recommendation. For example, a degree of confidence may be calculated, for example, based on the similarity value for an identified or selected stored task and a criteria factor that is associated with a criteria used to determine the similarity value for the identified stored task. For example, different criteria may be used to determine a similarity value for the stored tasks. In one example implementation, information objects may be used as a criteria. In another example implementation, KAs may be used as a criteria to determine or calculate similarity values. The use of KAs as a criteria may be more strict or more challenging than the use of only information objects, as noted above. Therefore, according to an example implementation, a task that is identified that most closely matches a current task based on a high or highest similarity value may have a higher degree of confidence if a stricter or more challenging criteria is used to determine or calculate similarity values. For example, a stored task that is identified or selected that most closely matches a current task based on a high or highest similarity value may have a higher degree of confidence if KAs (which are more strict or more challenging as a criteria) are used as a criteria as compared to if information objects are used as a criteria for calculating similarity values.

According to an example implementation, a criteria factor may be assigned to each different criteria that is used to determine similarity values. For example, a criteria factor of 0.6 may be used for information objects, and a criteria factor of 0.9 may be used if KAs are the criteria. The higher criteria factor for KAs (0.9 in this example) as compared to information objects (0.6 in this example) may, for example, indicate a higher degree of confidence that the stored task matches or substantially matches the current task and therefore, a higher degree of confidence in the proposal or recommendation to the user to open one or more additional information objects.

According to one example implementation, a degree of confidence for an identified stored task for a recommended or or proposed information object may be calculated as a product of the similarity value for the stored task times the criteria factor used to determine a similarity value for the stored task:

Degree of confidence=(similarity value)×(criteria factor).

For example, if a stored task has a similarity value of 0.5 and a criteria factor of 0.6 is used (based on use of information objects as a criteria), this would result in a degree of confidence for a recommendation to open an information object from such stored task of (0.5) (0.6)=0.3. On the other hand, if KAs are used as a criteria (resulting in a criteria factor of 0.9), and the identified stored task has a similarity value of 0.4, this would result in a degree of confidence of 0.36, for example. These are merely examples, and other examples and numbers may be used.

According to one example implementation, a degree of similarity may be determined by determining a similarity value for each stored task.

According to another example implementation, each task (e.g., current task and each stored task) may be or may include a graph of KAs, with each KA being a node in the graph, and a line or edge between each KA indicating a switch between KAs or nodes of the graph. For example, two KAs may be compared (e.g., to compare a current task to a stored task) by comparing graphs of each task, e.g., comparing a graph (including nodes and switches between KAs) of each KA. For example, a graph of a current task may be compared to a graph of a stored task to determine similarities of the tasks, such as, for example, if the same (or one or more) of the KAs of each graph are the same, the switching order of KAs and/or switching frequency between KAs for each graph are the same, or the degree of similarity (e.g., based on one or more of the number of KAs that are the same for the tasks, how close or similar the KA switching frequencies are for the two tasks, and a similarity of the switching order of the KAs or order of the KAs of the two tasks, etc.).

For example, a first graph for a current task may identify a KA of consuming email1 (task 1) that transitions (or switches) to authoring wordfile1 (task 2) 23 minutes later, and then switches to authoring email2 (task 3) 12 minutes later. The tasks and average switching rate (e.g., 17.5 minutes between task switches on average for these three KAs for this current task) may be compared to a graph of a stored task, for example, to determine a degree of similarity between these two tasks. This is merely an example, and other examples may be provided or used.

Figure 7:
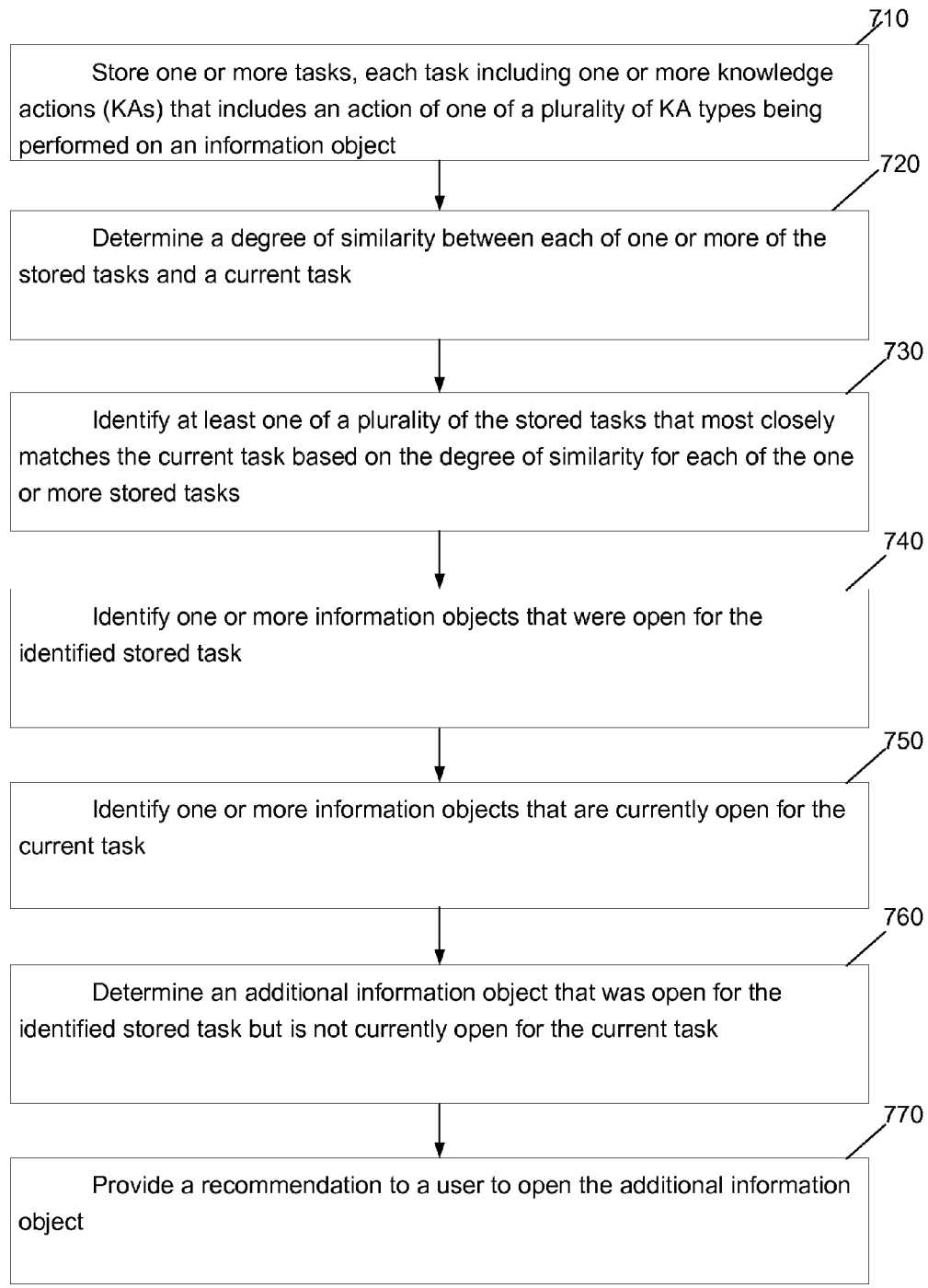
FIG. 7 is a flow chart illustrating operation of task analysis system 120 according to another example implementation.

FIG. 7 is a flow chart illustrating operation of task analysis system 120 according to another example implementation. At 710, store one or more tasks are stored (e.g., within task storage 616), each task including one or more knowledge actions (KAs) that includes an action of one of a plurality of KA types being performed on an information object. At 720, a degree of similarity is determined between each of one or more of the stored tasks and a current task. At 730, at least one of a plurality of the stored tasks are identified that most closely matches the current task based on the degree of similarity for each of the one or more stored tasks. At 740, one or more information objects are identified that were open for the identified stored task. At 750, one or more information objects are identified that are currently open for the current task. At 760, an additional information object is determined that was open for the identified stored task but is not currently open for the current task. At 770, a recommendation is provided to a user to open the additional information object.

According to an example implementation, operation 750 may include receiving a list of computer events, each event including a user interacting with a computer, determining one or more desktop operations, with each desktop operation including one or more computer events that are performed to accomplish the desktop operation, determining one or more knowledge actions, where each knowledge action includes a group of one or more desktop operations performed using a same application on a same information object, assigning the knowledge actions within the time window to a current task, and identifying one or more information objects that were open for the current task within the time window.

According to an example implementation, a recommendation may be provided or displayed to a user that includes an identifier of the additional information object to be opened, and a degree of confidence associated with additional information object.

According to an example implementation, the degree of similarity for each stored task as compared to the current task may be determined based on at least one of: 1) information objects that were open for both the current task and the stored task, and 2) KAs that were part of both the current task and the stored task.

According to an example implementation, the degree of similarity for each stored task as compared to the current task may be determined based on at least one of: 1) a number or percentage of information objects that were open for the stored task that were also open during a time window of the current task, and 2) a number or percentage of the KAs that were part of the stored task that were also part of the current task, where a KA being included or part of a stored task and a current task includes the same KA type operating on a same information object.

According to an example implementation, operation 730 may include identifying which stored task has a highest number or percentage of open information objects that are also open for the current task.

According to an example implementation, operation 730 may include identifying which stored task has a highest number or percentage of knowledge actions (KAs) that were part of a stored task that are also part of the current task, each KA including a KA type operating on an information object.

According to an example implementation, operation 720 may include determining a similarity value for each stored task as compared to the current task, wherein the similarity value is determined for each stored task based on a percentage or number of information objects that were open for a stored task that are also open for the current task during a time window.

According to an example implementation, operation 720 may include determining a similarity value for each stored task as compared to the current task, wherein the similarity value is determined for each stored task based on a percentage or number of KAs that are part of the stored task that are also part of the current task.

According to an example implementation, the recommendation provided to the user may include an identifier of the additional information object, and a degree of confidence associated with the additional information object, wherein the degree of confidence is determined based on the similarity value.

According to an example implementation, the recommendation provided to the user may include an identifier of the additional information object, and a degree of confidence associated with the additional information object, wherein the degree of confidence is determined based on the similarity value for the identified stored task and a criteria factor that is associated with a criteria used to determine the similarity value for the identified stored task.

According to an example implementation, a first criteria factor may be used if a first criteria is used to determine the similarity value for the identified stored task, and a second criteria factor may be used to determine the similarity value for the identified stored task if a second criteria is used to determine the similarity value for the identified stored task.

According to an example implementation, a first criteria factor is used if a number or percentage of information objects that were open for a stored task that are also open for the current task is used to determine the similarity value for the identified stored task, and wherein a second criteria factor is used to determine the similarity value for the identified stored task if a number or percentage of KAs used for a stored task that are also used for the current task is used to determine the similarity value for the identified stored task.

According to another implementation, the various techniques described in this disclosure may be applied to multi-user environments. For example, task analysis system 120 may be centrally located system, wherein event monitor may receive events from multiple users. Task miner 618 may identify desktop operations, KAs and tasks for each user, for example. Thus, for example, task miner 618 may identify KAs and tasks based on local or user-specific computer events. Or, for example, an event monitor 610 may be provided on or for each user computer system, and these events for multiple users may be centrally stored on a central or common (shared) task analysis system 120, for example. The central task analysis system 120 may, for example, receive tasks and/or events for multiple users, and may make recommendations to open an information object for multiple users based on multiple user's stored tasks, and current tasks from different users, for example.

Alternatively, each user (or user computer) may include a task analysis system (or portion thereof) including an event monitor 610, an event storage 612 (for storing events for a user), and a task miner 618, and task storage 616 (for storing tasks for a user). The tasks for each user (e.g., from multiple user systems) may be provided and stored in a task storage 616 at a central task analysis system 120. The recommendation generator 613 may then access current tasks for each user and stored tasks for each user in order to provide a recommendation to open an additional information object for each of one or more users.

According to an example implementation, recommendation generator 613 at a central or shared task analysis system 120 may provide a recommendation to a first user to open an additional information object based on a current task of the first user and one or more stored tasks of multiple users, such as based on a second stored task for a second user and a third stored task for a third user. For example, the recommendation generator 613 at a central task analysis system 120 may determine a degree of similarity between a current task of a user and one or more stored tasks of multiple (other) users. For example, recommendation generator 613 at a central task analysis system 120 may determine a degree of similarity, e.g., a similarity value, for a second stored task of a second user and a current task of a first user, and determine a degree of similarity, e.g., a similarity value, for a third stored task of a second user and a current task of a first user, etc. One or more tasks of one or more users may be selected or identified that most closely match the current task of the first user. One or more information objects that were open for each of the selected or identified stored tasks along with their associated activity types or KA types (e.g., based on the KA classification for the information object). may be identified. And, an (or at least one) additional information object may be determined or identified by central task analysis system 120 that was open for the identified or selected stored task(s) but is not open for the current task, along with an activity type that was performed by the other user on such information object (e.g., authoring, consuming/reviewing, communicating, . . . ). Task analysis system 120 may then provide a recommendation to a current user to open such identified information object and to perform the associated activity on such information object.

For example, user 1 may be involved in task 1 relating to making travel reseervations to Italy, including consuming or viewing travel website 1 (among other sites). User 2 was previously involved in a similar task of making travel reservations to Italy, and consumed or viewed travel website 2 as part of that task 2. Task 2 of user 2 may be identified or selected as most closely (or sufficiently) matching the current task 1 for user 1. Therefore, it may be determined that task 1 of user 1 does not currently have open travel website 2 (identified from matching task 2 from user Therefore, recommendation generator 613 may provide a recommendation to user 1 to open travel website 2 and also to review or consume this travel website 2 (the same activity type that was performed by user 2 on this information object), based on the similarity between task 1 (from user 1) and task 2 (from user 2). In this manner, information, such as stored tasks from multiple users (e.g., other users and/or the current user) as compared to a current task of another user, may advantageously be used to provide recommendations to a user to open an additional information object as well as recommend an activity type to be performed on such recommended information object.

Figure 8:
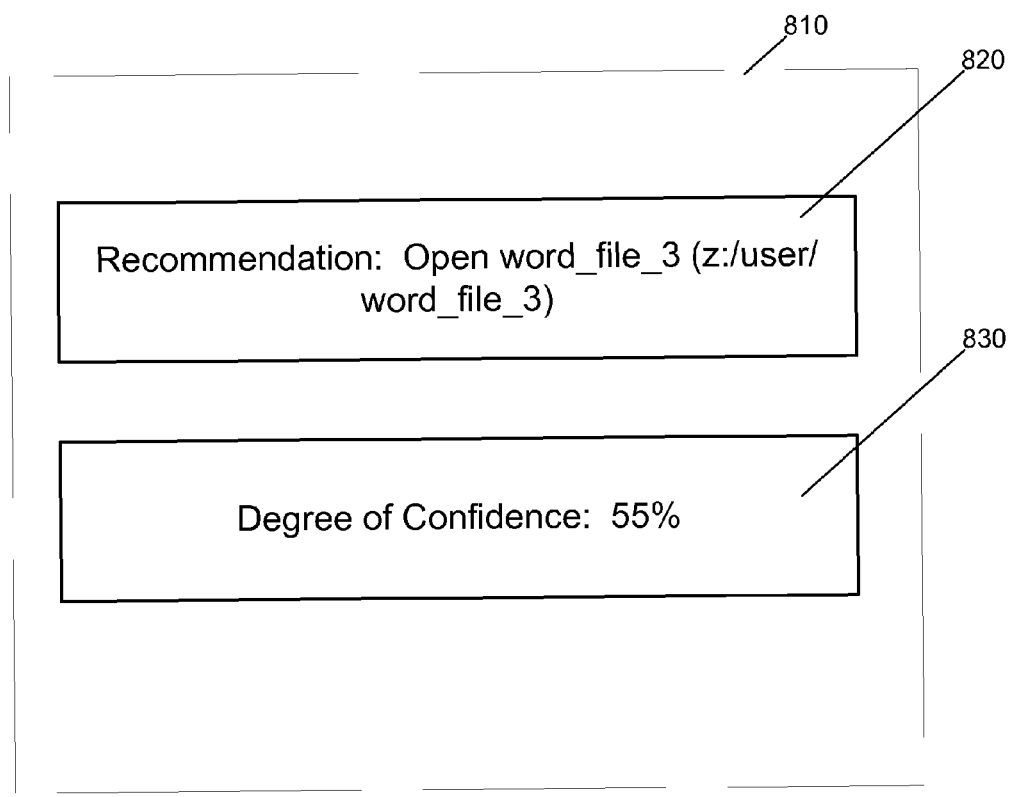
FIG. 8 is a diagram illustrating an example display of a recommendation that may be provided or displayed to a user according to an example implementation.

FIG. 8 is a diagram illustrating an example display of a recommendation that may be provided or displayed to a user according to an example implementation. Display 810 may be displayed or provided to a user. Display 810 may include, for example, a recommendation 810 to open an additional information object, such as word_file_3, and provide a location or identifier of the recommended information object, for example. An example recommendation may include: "Recommendation: Open word_file_3 (z:/user/word_file_3). Display 810 may also identify a degree of confidence 830 for recommendation 820. For example, the degree of confidence 830 may state: "Degree of Confidence: 55%". A graphical indicator (such as a bar graph indicating 55%) associated with the degree of confidence may also be provided or displayed to the user. This is merely an example, and other recommendations may be provided or displayed.

Figure 9:
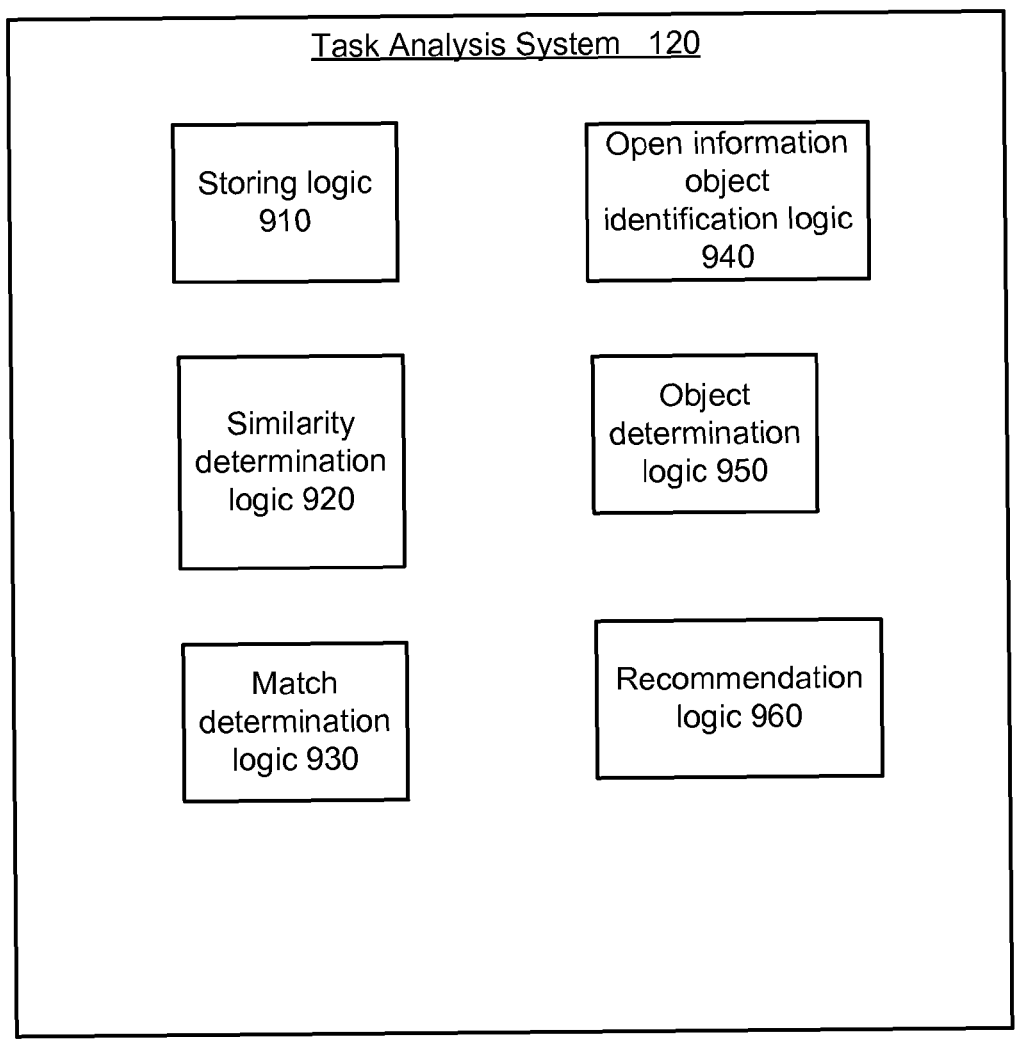
FIG. 9 is a block diagram illustrating a system according to an example implementation.

FIG. 9 is a block diagram illustrating a system according to an example implementation. Storing logic 910 is configured to store one or more tasks, each task including one or more knowledge actions (KAs) that includes an action of one of a plurality of KA types being performed on an information object. Similarity determination logic 920 is configured to determine a degree of similarity between each of one or more of the stored tasks and a current task. Match determination logic 930 is configured to identify at least one of a plurality of the stored tasks that most closely matches the current task based on the degree of similarity for each of the one or more stored tasks. Open information object identification logic 940 configured to identify one or more information objects that were open for the identified stored task. The open information object identification logic 940 is also configured to identify one or more information objects that are currently open for the current task. Object determination logic 950 is configured to determine an additional information object that was open for the identified stored task but is not currently open for the current task. And, recommendation logic 960 is configured to provide a recommendation to a user to open the additional information object.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory machine-readable storage device (e.g., a semiconductor or magnetic material-based storage device), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet. Thus, while certain features of the described implementations have been illustrated as described herein, many modifications, substitutions, changes and equivalents will now occur to those skilled in the art. It is, therefore, to be understood that the appended claims are intended to cover all such modifications and changes.

What is claimed is:

1. A computer program product, the computer program product being tangibly embodied on a non-transitory computer-readable storage medium and including executable code that, when executed, is configured to cause at least one data processing apparatus to:
   identify a current task including one or more knowledge actions (KAs) that include an action of one of a plurality of KA types being performed on an information object;
   identify one or more information objects that are currently open for the current task;
   determine an additional information object that was open for a stored task but is not currently open for the current task; and
   provide a recommendation to open the additional information object,
   wherein the recommendation includes an identifier of the additional information object, and a degree of confidence that is determined based on a task similarity value for the stored task and a criteria factor,
   the criteria factor being a first criteria factor when a number or percentage of information objects that were open for the stored task that are also open for the current task is used to determine the task similarity value, and the criteria factor being a second criteria factor when a number or percentage of KAs used for the stored task that are also used for the current task is used to determine the task similarity value for the stored task.

2. The computer program product of claim 1 wherein the code is configured to cause the at least one data processing apparatus to:
   receive a list of computer events, each event including a user interacting with a computer;
   determine one or more desktop operations, with each desktop operation including one or more computer events that are performed to accomplish the desktop operation;
   determine one or more knowledge actions, where each knowledge action includes a group of one or more desktop operations performed using a same application on a same information object;
   determine one or more tasks, with each task including a group of knowledge actions that include information objects that are semantically related; and
   store the one or more tasks.

3. The computer program product of claim 1 wherein the code is configured to cause the at least one data processing apparatus to perform the following over a current time window for a current task:
   receive a list of computer events, each event including a user interacting with a computer;
   determine one or more desktop operations, with each desktop operation including one or more computer events that are performed to accomplish the desktop operation;
   determine one or more knowledge actions, where each knowledge action includes a group of one or more desktop operations performed using a same application on a same information object;
   assign the knowledge actions within the time window to the current task; and
   identify one or more information objects that were open for the current task within the time window.

4. The computer program product of claim 1 wherein a degree of similarity for the stored task as compared to the current task is determined based on at least one of: 1) information objects that were open for both the current task and the stored task, and 2) KAs that were part of both the current task and the stored task.

5. The computer program product of claim 1 wherein a degree of similarity for the stored task as compared to the current task is determined based on at least one of:

1) a number or percentage of information objects that were open for the stored task that were also open during a time window of the current task, and
2) a number or percentage of the KAs that were part of the stored task that were also part of the current task, where a KA being included or part of the stored task and a current task includes the same KA type operating on a same information object.

6. The computer program product of claim 1 wherein the code is configured to cause the at least one data processing apparatus to identify the stored task from amongst a plurality of the stored tasks as a task having a highest number or percentage of open information objects that are also open for the current task.

7. The computer program product of claim 1 wherein the code is configured to cause the at least one data processing apparatus to identify the stored task from amongst a plurality of the stored tasks as a task having a highest number or percentage of knowledge actions (KAs) that were part of the task that are also part of the current task, each KA including a KA type operating on an information object.

8. The computer program product of claim 1 wherein the code is configured to cause the at least one data processing apparatus to determine the task similarity value for the stored task as compared to the current task based on a percentage or number of information objects that were open for a stored task that are also open for the current task during a time window.

9. The computer program product of claim 1 wherein the code is configured to cause the at least one data processing apparatus to determine the task similarity value for the stored task as compared to the current task based on a percentage or number of KAs that are part of the stored task that are also part of the current task.

10. A computer implemented method performed by a processor, the method comprising:
   identifying a current task including one or more knowledge actions (KAs) that includes an action of one of a plurality of KA types being performed on an information object;
   identifying a stored task from amongst a plurality of stored tasks that most closely matches the current task based on a degree of similarity for the stored task compared to the current task;
   identifying one or more information objects that are currently open for the current task;
   determining an additional information object that was open for the stored task but is not currently open for the current task; and
   providing a recommendation to a user to open the additional information object,
   wherein the recommendation includes an identifier of the additional information object, and a degree of confidence that is determined based on a task similarity value for the stored task and a criteria factor,
   the criteria factor being a first criteria factor when a number or percentage of information objects that were open for the stored task that are also open for the current task is used to determine the task similarity value, and the criteria factor being a second criteria factor when a number or percentage of KAs used for the stored task that are also used for the current task is used to determine the task similarity value for the stored task.

11. The method of claim 10 further comprising:
   receiving a list of computer events, each event including a as user interacting with a computer;

determining one or more desktop operations, with each desktop operation including one or more computer events that are performed to accomplish the desktop operation;

determining one or more knowledge actions, where each knowledge action includes a group of one or more desktop operations performed using a same application on a same information object;

determining one or more tasks, with each task including a group of knowledge actions that include information objects that are semantically related; and storing the one or more tasks.

12. The method of claim 10 wherein identifying the stored task from amongst a plurality of stored tasks that most closely matches the current task based on the-degree of similarity for the stored task compared to the current task include determining degree of similarity based on at least one of: 1) a number or percentage of information objects that were open for the stored task that were also open during a time window of the current task, and 2) a number or percentage of the KAs that were part of the stored task that are also part of the current task, where a KA being included or part of a stored task and a current task includes the same KA type operating on a same information object.

13. The method of claim 10 wherein identifying the stored task from amongst a plurality of stored tasks that most closely matches the current task comprises identifying which task amongst the plurality of stored tasks has a highest number or percentage of open information objects that are also open for the current task.

14. The method of claim 10 wherein identifying the stored task from amongst a plurality of stored tasks that most closely matches the current task comprises identifying which task amongst the plurality of stored tasks has a highest number or percentage of knowledge actions (KAs) that were part of the task that are also part of the current task, each KA including a KA type operating on an information object.

15. The method of claim 10 wherein the task similarity value is determined for the stored task based on a percentage or number of information objects that were open for the stored task that are also open for the current task during a time window.

16. The method of claim 10 wherein the task similarity value is determined for the stored task based on a percentage or number of KAs that are part of the stored task that are also part of the current task.

17. The method of claim 10 wherein the current task is for a first user, and the stored task is for one or more other users.

18. An apparatus comprising:

a processor coupled to a memory, the processor and memory forming logic circuitry, the logic circuitry including, identifying logic configured to identify a current task including one or more knowledge actions (KAs) that include an action of one of a plurality of KA types being performed on an information object;

match determination logic configured to identify a stored task that most closely matches the current task based on a degree of similarity compared to the current task;

open information object identification logic configured to identify one or more information objects that were open for the stored task and to identify one or more information objects that are currently open for the current task;

object determination logic configured to determine an additional information object that was open for the stored task but is not currently open for the current task; and recommendation logic configured to provide a recommendation to open the additional information object, wherein the recommendation includes an identifier of the additional information object, and a degree of confidence that is determined based on a task similarity value for the stored task and a criteria factor, the criteria factor being a first criteria factor when a number or percentage of information objects that were open for the stored task that are also open for the current task is used to determine the task similarity value, and the criteria factor being a second criteria factor when a number or percentage of KAs used for the stored task that are also used for the current task is used to determine the task similarity value for the stored task.

19. The apparatus of claim 18 wherein the match determination logic is configured to determine the degree of similarity for the stored task as compared to the current task based on at least one of: 1) a number or percentage of information objects that were open for the stored task that were also open during a time window of the current task, and 2) a number or percentage of the KAs that were part of the stored task that are also part of the current task, where a KA being included or part of the stored task and the current task includes the same KA type operating on a same information object.

20. The apparatus of claim 18 further comprising storing logic configured to:

receive a list of computer events, each event including a user interacting with a computer;

determine one or more desktop operations, with each desktop operation including one or more computer events that are performed to accomplish the desktop operation;

determine one or more knowledge actions, where each knowledge action includes a group of one or more desktop operations performed using a same application on a same information object;

determine one or more tasks, with each task including a group of knowledge actions that include information objects that are semantically related; and store the one or more tasks.

21. The apparatus of claim 18 wherein the match determination logic is configured to identify the stored task that most closely matches the current task by identifying which task from amongst a plurality of stored tasks has a highest number or percentage of open information objects that are also open for the current task.

22. The apparatus of claim 18 wherein the match determination logic is configured to identify the stored task that most closely matches the current task by identifying which task from amongst a plurality of stored tasks has a highest number or percentage of knowledge actions (KAs) that were part of the task that are also part of the current task, each KA including a KA type operating on an information object.

23. The apparatus of claim 18 wherein the match determination logic is configured to determine the degree of similarity based on at least one of:

1) information objects that were open for both the current task and the stored task, and 2) KAs that were part of both the current task and the stored task.

24. The apparatus of claim 18 wherein the match determination logic is configured to determine the degree of similarity for the stored task as compared to the current task based on a percentage or number of information objects that were open for the stored task that are also open for the current task during a time window.

25. The apparatus of claim 18 wherein the match determination logic is configured to determine the degree of similarity for the stored task as compared to the current task based on a percentage or number of KAs that are part of the stored task that are also part of the current task.

26. The apparatus of claim 18 wherein the current task is for a first user, and the stored task for one or more other users.

* * * * *